Sept. 12, 1950
J. MIHALYI ET AL
QUICK-LOADING ROLL FILM CAMERA
AND CARTRIDGE THEREFOR
2,521,932

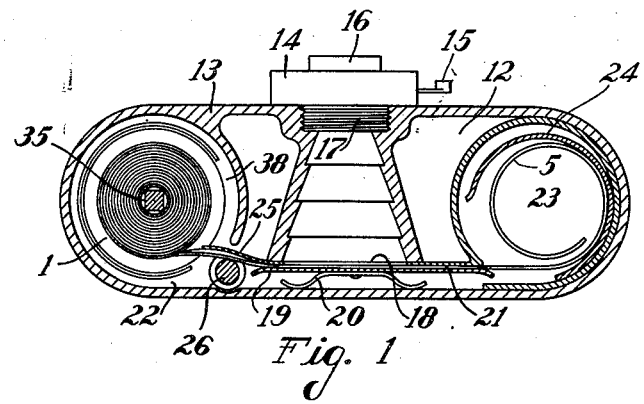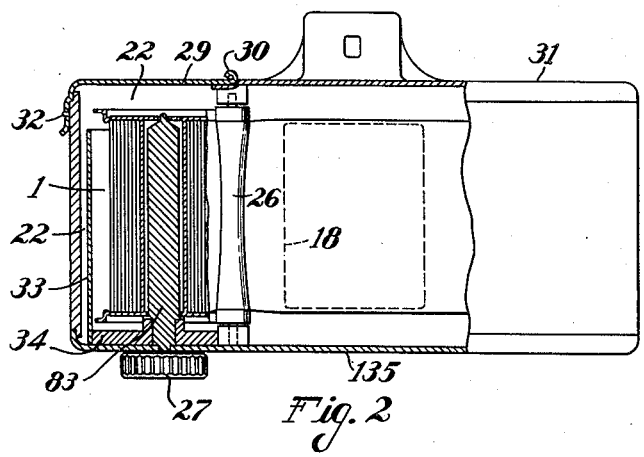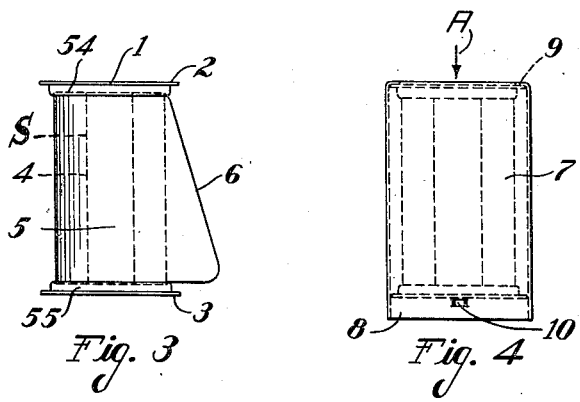

Filed Jan. 8, 1947

JOSEPH MIHALYI
ERWIN J. WARD
INVENTOR.

BY

ATTORNEYS

Patented Sept. 12, 1950

2,521,932

UNITED STATES PATENT OFFICE 2,521,932

QUICK-LOADING ROLL FILM CAMERA AND CARTRIDGE THEREFOR

Joseph Mihalyi and Erwin J. Ward, Rochester, N. Y., assignors to Eastman Kodak Company, Rochester, N. Y., a corporation of New Jersey Application January 8, 1947, Serial No. 720,766

14 Claims. (Cl. 242—71)

1

This invention relates to photography and particularly to a rapid-loading device for roll film cameras. One object of our invention is to provide a simple type of roll film cartridge which adequately protects film against light, and which can be rapidly and accurately loaded into a camera. Another object of our invention is to provide a receptacle in the camera to receive a roll of film carried by a spool and to provide a mechanism which facilitates the rapid insertion and removal of the film spool from the camera. A still further object of our invention is to provide a special type of film cartridge which co-operates with a special type of film receptacle in such a manner that the loading and unloading operations can be readily carried out with but little chance of improper loading. Other objects will appear from the following specification, the novel features being particularly pointed out in the claims at the end thereof.

In the usual type of roll film camera, the camera is provided with supply and take-up film spool chambers and two film spools are used, one in the supply and one in the take-up chamber. The film, or the film with its backing paper, normally has to be threaded to the empty spool in the take-up chamber, and film is wound from one spool to the other, as exposures are made. When the exposed film is removed, the empty spool must be changed from the supply to the take-up chamber and a fresh spool of film inserted. Such a loading arrangement was not only comparatively slow and cumbersome, but it suffered from the difficulty that it frequently happened that the backing paper, or film, would be improperly threaded on the take-up spool and, occasionally, improper winding would result.

In Patent No. 2,336,278, J. Mihalyi, for "Film Winding Apparatus," granted December 7, 1943, there is illustrated a camera into which a spool of film can be readily inserted and removed through an axial movement of the film into the film spool chamber, only one film spool being required; the film being wound from the one spool into a loose coil and back on the original spool. It is to this type of camera that the present invention is particularly directed.

Coming now to the drawings wherein like reference characters denote like parts throughout:

Fig. 1 is a section through a camera in which a loading receptacle, constructed in accordance with a preferred embodiment of our invention, is shown;

Fig. 2 is a rear elevation shown partially in section of the camera shown in Fig. 1;

Fig. 3 is a side elevation of a spool of film which may be used in the camera shown in the preceding views;

Fig. 4 is a side elevation of a film cartridge

Figure 5:
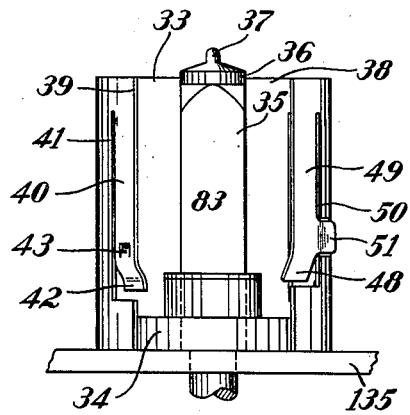
Figure 6:
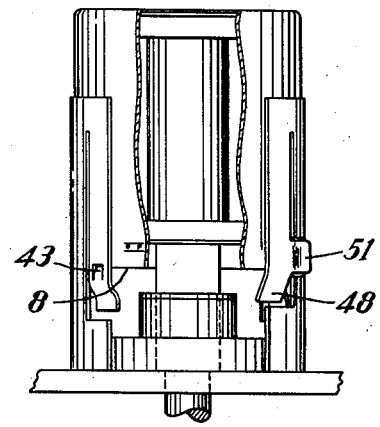
Figure 7:
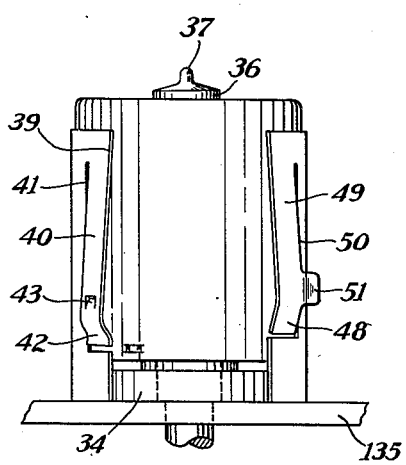
Figure 8:
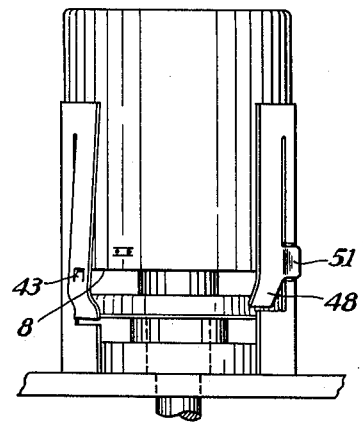
Figure 9:
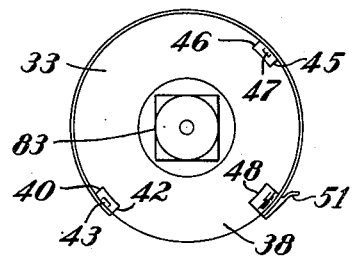

2 constructed in accordance with a preferred form of our invention, showing the film spool of Fig. 3 carried by a light-protective container and forming a complete film cartridge constructed in accordance with our invention;

Fig. 5 is a side elevation shown in partially fragmentary form, showing the film receptacle of a camera constructed in accordance with a preferred form of our invention;

Fig. 6 is a view similar to Fig. 5 with a film cartridge partially inserted into the receptacle of Fig. 5;

Fig. 7 is a view similar to Fig. 6, but with the film cartridge in condition to be removed from the camera;

Fig. 8 is a view similar to Fig. 7 but with the film cartridge shown with the protecting covering partially removed from the spool; and Fig. 9 is a top plan view of the partially-cylindrical container in the camera which receives the film cartridge in both loading and unloading.

Our invention broadly consists in providing a light-tight film cartridge comprising a spool with convolutions of film, or convolutions of film and backing paper, wound thereon; this film spool being contained in a generally-cylindrical container having a flange at one end and one or more protuberances at the opposite end to serve as a snap-latch, holding the film spool normally in the container to protect the film against light. In a preferred form of film cartridge, no backing paper whatever is used, although the film has an opaque backing.

Such a film cartridge is constructed for the rapid insertion and removal of the film spool in a camera; the camera being provided with a receptacle for the film spool, this receptacle including interlocking members which prevent the improper positioning of the receptacle in a camera.

More specifically, a preferred form of film cartridge is shown in Figs. 3 and 4. Fig. 3 shows a spool designated generally as "S" having spaced flanges 2 and 3, these flanges being welded, or otherwise attached, to a hub 4. Convolutions of film 5 are wound on the hub 4, this film having a sensitized surface on one side and an opaque backing on the opposite side, as is well known. The end of the film 5 may be cut at an angle 6 to facilitate passing the film through the camera. The film spool, with its convolutions of film is then placed in a container 7, which is generally cylindrical in shape, open at the end 8, and having a small flange 9 projecting inwardly and overlapping the periphery of the upper film spool flange 2. This cylindrical container, because of its relatively-close fit between the flanges 2 of the spool and the cylindrical portion 7 of the container, prevents most light from entering between the flanges and thus materially reduces light fog which might otherwise occur.

The cylindrical container 7 is provided with one or more protuberances 10 around the open bottom 8; these protuberances serving as one element of a snap-latch for holding the film spool in place, the flange of the film spool serving as the other element of a snap-latch. Therefore, the film spool can be readily snapped out of the container 7 by downward pressure along the line of the arrow "A," shown in Fig. 4. This dislodges the film spool in an axial direction so that it may readily move from the container.

As above explained, this camera may be of the type shown in Mihalyi patent above referred to. The camera, schematically shown in Figs. 1 and 2, may consist of a camera body 12 having a front wall 13 on which a camera shutter 14 may be mounted, this shutter preferably having the usual trigger 15. The objective may be contained in a front lens cell 16, or, if the lens is of the double type, the cell 16 may hold the front lens element and a rear lens element may be held inside of the threaded tube 17 which holds the camera shutter on the camera body 12.

There is an exposure frame 18 through which light passes to the film in making an exposure, and a spring-presser member 19 is provided and thrust forwardly by the spring 20 to hold the film flat for exposure, and to form a part of a guiding channel which may be designated broadly as 21, leading from a supply spool chamber 22 to a take-up chamber 23. As indicated in the above-mentioned Mihalyi patent, the take-up chamber 23 is provided with a leaf spring 24, which may cause the film 5 to coil in a free loop when the film is propelled into the chamber 23. The chamber 22 is the supply chamber and there is a film guide 25 formed of a fixed plate on one side and an hour-glass shaped roller 26 on the other side between which the film may pass. When the film spool 1 is turned as by a winding knob 27, shown in Fig. 2, the edge 6 of the film catches behind the guide 25 and the film is forced through the film guide and into the take-up chamber. By winding the film intermittently, exposures may be made and any suitable form of film-measuring arrangement may be employed.

The supply film chamber 22 is provided with a door 29 hinged at 30 to the top wall 31 of the camera, there being a snap-latch 32 for holding this door in a closed position. The film is loaded and unloaded through the door 29.

The supply chamber has a winding shaft 83 attached to the winding knob 27; this shaft preferably, but not necessarily, extending upwardly substantially the full length of the spool 1 to support the spool in the proper position.

The supply chamber 22 is provided with a special partially-cylindrical receptacle 33 which may be entirely supported by a support 34 carried by the bottom wall 135 of the camera.

Referring to the last four figures where the film support is shown more in detail, the film-supporting shaft 83 may consist of an upper portion 35 which is square in cross section, this square cross section being molded into a circular cross section at 36 and terminating in a small, rounded end 37.

The semi-cylindrical receptacle 33 is open through perhaps 35 or 40 degrees, as indicated at 38 in Fig. 1; the wall being eliminated through this particular area. On one edge 39 of this open section there is a spring 40 formed by slotting the container at 41, this spring having an end 42 projecting into the container and including a bent-over lug 43 extending just into the container. This spring has a counterpart in a second spring member, as shown in Fig. 9, which is exactly like it but it is arranged preferably at 180 degrees from the spring 40. This spring 45 is provided with a bottom edge 46 similar to the inwardly-turned edge 42 and is also provided with an inwardly-turned lug 47 similar to the inwardly-turned lug 43. The purpose of these two springs is to facilitate loading and unloading. In loading, the film cartridge is inserted, as indicated in Fig. 6, and is moved downwardly until the lower edge 8 of the cylindrical container strikes the inwardly-turned lugs 43 and 47. This stops the downward movement of the container. By pressing on the upper film spool flange and drawing upwardly on the container, the container will then be removed from the spool which will be held in its lowermost position because the flange of the spool will be engaged on the inside by a holding latch 48 of a spring arm 49 formed by slotting the receptacle at 50. If desired, an outwardly-extending lug 51 may be provided for manually releasing this latch member, but whether or not this latch is provided, when the cartridge is inserted and the film spool is pressed downwardly, as above described, the lower spool flange will be held in position. This position is shown in Fig. 8. The cylindrical container is then removed, the camera cover 29 closed, and by turning the handle 27, the edge 6 of the film will engage the guide passing between the guide 25 and the roller 26 which bows the film in cross section so that it may pass from between the inwardly-formed beads 54 and 55 of the spool. The film may be propelled into the take-up chamber 23 in a loose coil and then may be returned to the original spool 1 by winding the handle 27 in a reverse direction. Exposures may be made while the film is passing either from left to right, or vice versa, but, of course, must not be made when the film is passing in both directions.

When the film has been completely exposed and it is desired to remove the exposed roll of film, the cylindrical container is inserted over the spool and pressed down into the partially-cylindrical receptacle 33. As the cylindrical member moves downwardly, it can no longer be caught by the proposed in-turned flanges 43 and 47 because the lower film spool flange lies opposite the turned-in portions 42 and 46 of the spring members 40 and 45, thus holding them outwardly to such an extent that the cylindrical container can pass freely down until it completely encloses the film spool. In this downward movement, the cylindrical container engages and cams outwardly the latch member 48 which previously held the lower flange of the film spool so that the inwardly-formed protuberances 10 of the container may snap over the lower flange 3 of the film spool to latch the film spool in the container. The container may then be raised, moving the spool freely with it, and the exposed film in the cartridge will be protected against light.

While it has taken some time to describe the operation of loading and unloading our preferred form of quick-loading film cartridge and camera, actually these operations can take place extremely rapidly and extremely easily. Each time a film is loaded or unloaded into the camera, it is loaded axially through the door 29 which can be rapidly opened and closed, and the film is always protected against light in both loading and unloading operations. Moreover, the film cartridge itself is relatively inexpensive, in spite of the cylindrical container, because the film cartridge only consists of a film spool with convolutions of film wound thereon, and the outer cylindrical covering. The preferable omission of the backing paper with its pasters for attaching the film thereto also materially reduces the time of preparing film rolls, so that these, particularly in the smaller sizes, can be made very inexpensively.

It will be noticed that the interlocking mechanism between the film cartridge and the camera prevents the camera from being improperly loaded in that in introducing the film cartridge into the camera, the cylindrical container can only be loaded until caught by the inwardly-turned lugs 43 and 46. Since the pressure on the film cartridge is downwardly, slight pressure applied to the upper film flange then immediately moves the spool downwardly until it is latched by the latch element 48 snapping over the inside wall of the flange. This allows the cylindrical container to be drawn out and automatically releases the latch formed by the indentations 10 and the lower flange. At the same time, the lower flange lies opposite the two inwardly-turned ends 42 and 46 of the spring arms 40 and 45, thus holding the inwardly-turned lugs 43 and 47 out of an operative position. When out of an operative position, the container can be moved all the way down over the film as occurs in unloading the film, so that the spool may be again latched in the container.

We claim:

1. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, and a snap-latch carried by the receptacle for engaging a flange of the spool when the spool is axially moved into the receptacle to definitely retain the spool therein.

2. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, and a snap-latch carried by the receptacle for engaging a flange of the spool when axially moved into the receptacle to definitely retain the spool therein, said snap-latch comprising a spring arm adapted to be flexed as a film spool flange moves axially past the latch and to spring over the flange to definitely retain the spool therein.

3. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, a snap-latch carried by the receptacle for engaging a flange of the spool when the spool is axially moved into the receptacle to definitely retain the spool therein, and a pin in the receptacle for supporting the film spool for turning relative to the receptacle.

4. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, a snap-latch carried by the receptacle for engaging a flange of the spool when axially moved into the receptacle to definitely retain the spool therein, and a pin in the receptacle for supporting the film spool for turning relative to the receptacle, said snap-latch permitting rotative movement of the film spool and retaining the spool in an operative position in the receptacle.

5. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, a snap-latch carried by the receptacle for engaging a flange of the spool when axially moved into the receptacle to definitely retain the spool therein, and a pin in the receptacle for supporting the film spool for turning relative to the receptacle, the latch being positioned to snap over the spool flange as the spool is loaded axially into the receptacle and on the pin to hold the spool against axial movement while permitting rotative movement of the spool on the pin and in the holder.

6. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, and a snap-latch carried by the holder for engaging a flange of the spool when axially moved into the receptacle to definitely retain the spool therein, and means for releasing the snap-latch.

7. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, and a snap-latch carried by the receptacle for engaging a flange of the spool when axially moved into the receptacle to definitely retain the spool therein, and means separate from the holder for releasing the latch to facilitate removal of the film.

8. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, and a snap-latch carried by the receptacle for engaging a flange of the spool when axially moved into the receptacle to definitely retain the spool therein, the cylindrical container for the film being adapted to be used to release the snap-latch holding the spool flange against axial movement to facilitate removal of the film.

9. A roll holder for cameras of the type in which a film cartridge, comprising a flanged spool carrying convolutions of film and covered by a cylindrical container, may be mounted for exposure of the film and comprising a receptacle carried by the camera into which the film spool may be axially loaded, means for limiting movement of the container into the receptacle, and a snap-latch carried by the receptacle for engaging a flange of the spool when axially moved into the receptacle to definitely retain the spool therein, the cylindrical container for the film being adapted to be used to release the snap-latch holding the spool flange against axial movement in the receptacle to facilitate removal of the film, said cylindrical container for the film including a snap-latch element positioned to engage a film spool flange when said cylindrical container completely surrounds the film cartridge whereby said cylindrical container may release the latch holding the spool in the receptacle and latch the spool in the cylindrical container to facilitate removal of the spool from the holder.

10. In a roll film holder for cameras, the combination with a support, of an axially loadable receptacle carried by the support, a film cartridge comprising a film spool having flanges, film convolutions thereon and a cylindrical container enclosing the film spool and film, said container being of a size to telescope into the axially loadable receptacle, and means carried by the loadable receptacle to normally limit the telescoping movement of the cylindrical container.

11. In a roll film holder for cameras, the combination with a support, of an axially loadable receptacle carried by the support, a film cartridge comprising a film spool having flanges, film convolutions thereon and a cylindrical container enclosing the film spool and film, said container being of a size to telescope into the axially loadable receptacle, and means carried by the loadable receptacle to normally limit the telescoping movement of the cylindrical container, said means being movably mounted on the container, and movable by a film spool flange to an inoperative position.

12. In a roll film holder for cameras, the combination with a support, of an axially loadable receptacle carried by the support, a film cartridge comprising a film spool having flanges, film convolutions thereon and a cylindrical container enclosing the film spool and film, said container being of a size to telescope into the axially loadable receptacle, means carried by the loadable receptacle to normally limit the telescoping movement of the cylindrical container, and a spring latch element positioned to engage and latch the flange of a film spool against axial movement in the receptacle.

13. In a roll film holder for cameras, the combination with a support, of an axially loadable receptacle carried by the support, a film cartridge comprising a film spool having flanges, film convolutions thereon and a cylindrical container enclosing the film spool and film, said container being of a size to telescope into the axially loadable receptacle, means carried by the loadable receptacle to normally limit the telescoping movement of the cylindrical container therein, and a spring latch element positioned to engage and latch the flange of a film spool against axial movement from the receptacle, a spring carrying the means for limiting the telescoping movement of the cylindrical container, the film spool flange when latched against axial movement contacting with the spring to hold the means for limiting the telescoping movement of the cylindrical container inoperative.

14. In a roll film holder for cameras, the combination with a support, of an axially loadable receptacle carried by the support, a film cartridge comprising a film spool having flanges, film convolutions thereon and a cylindrical container normally enclosing the film spool and film, said container being of a size to telescope into the axially loadable receptacle, and means carried by the loadable receptacle to normally limit the telescoping movement of the cylindrical container therein, a spring latch element positioned to engage and latch the film of a film spool against axial movement from the receptacle, a spring carrying means for limiting the telescoping movement of the cylindrical container relative to the loadable receptacle, the film spool flange when latched against axial movement from the receptacle contacting with the spring to hold the means for limiting the telescoping movement of the cylindrical container inoperative, and the cylindrical container contacting with and releasing the latch for holding a film spool flange against axial movement from the receptacle when said container telescopes into the axially loaded receptacle.

JOSEPH MIHALYI.
ERWIN J. WARD.

REFERENCES CITED

The following references are of record in the file of this patent:

FOREIGN PATENTS

| Number | Country | Date |
|---|---|---|
| 514,789 | Germany | Mar. 8, 1929 |